United States Patent
Palmenberg

[15] 3,639,994
[45] Feb. 8, 1972

[54] MEANS FOR MEASURING BOW IN A TURBINE BLADE

[72] Inventor: Edward C. Palmenberg, Nanuet, N.Y.

[73] Assignee: Chromalloy American Corporation, Orangeburg, N.Y.

[22] Filed: Apr. 23, 1970

[21] Appl. No.: 31,286

[52] U.S. Cl. .................................................. 33/174 PA
[51] Int. Cl. ...................................................... G01b 5/20
[58] Field of Search ............ 33/174 C, 174 P, 174 PA, 174 PB

[56] References Cited

UNITED STATES PATENTS

| | | | |
|---|---|---|---|
| 2,839,836 | 6/1958 | Fuller | 33/174 PA |
| 3,464,119 | 9/1969 | Griggs | 33/174 C |

FOREIGN PATENTS OR APPLICATIONS

| | | | |
|---|---|---|---|
| 693,023 | 6/1953 | Great Britain | 33/174 G |

Primary Examiner—Leonard Forman
Assistant Examiner—Charles E. Phillips
Attorney—Sandoe, Hopgood and Calimafde

[57] ABSTRACT

The invention contemplates a bow-measuring instrument in which simultaneous evaluation of the bow in a turbine vane is made at offset alignments, on both the convex and the concave surfaces of the airfoil section of the vane. The offsets are selected, for each type vane, so as to critically observe the extent of bow at or near the local regions at which these surfaces cooperate to define a nozzle throat, when vanes are assembled in side-by-side circumferential adjacency in a given gas-turbine stage; specifically, the "high point" in the center of the airfoil is observed for bow, at the center and along the alignment of the die-loading, in the hot-forming correction of vane shape. In this manner, a simple gaging operation helps to achieve greatly enhanced control of the uniformity and correct sizing of all nozzle-throat areas in a given stage of the turbine; and much better referencing is obtained for further gaging techniques.

27 Claims, 8 Drawing Figures

PATENTED FEB 8 1972

3,639,994

INVENTOR
EDWARD C. PALMENBERG

BY
Sandoe, Hopgood & Calimafde
ATTORNEYS

PATENTED FEB 8 1972
3,639,994
SHEET 2 OF 2
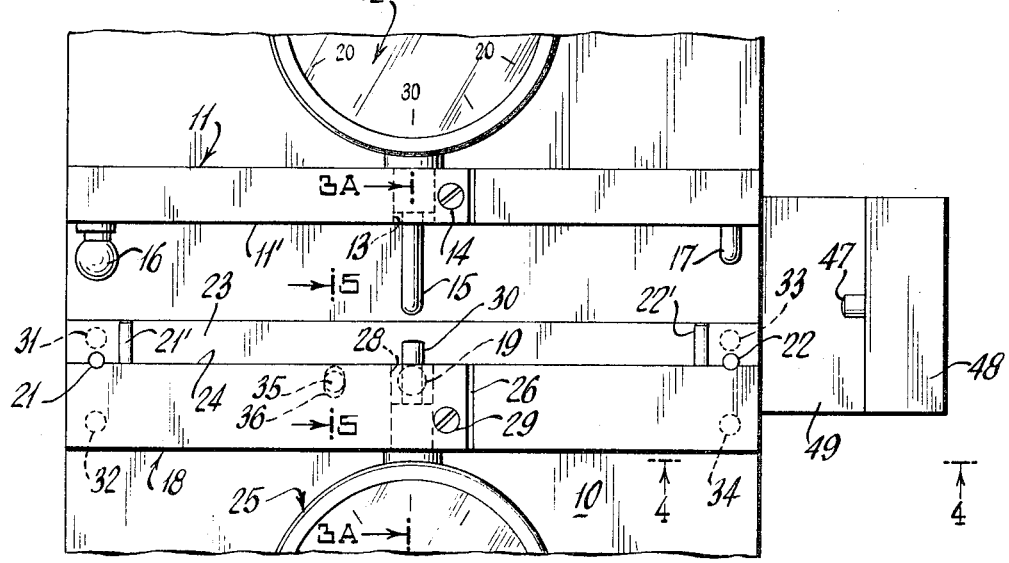
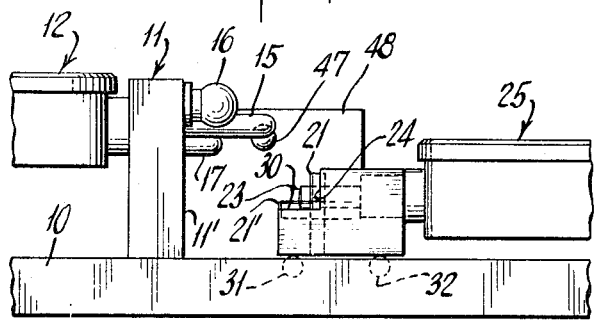
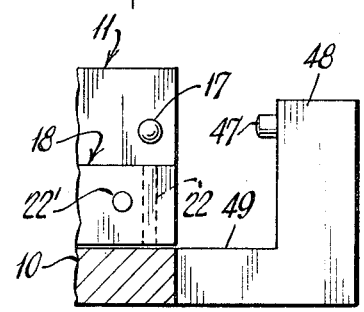
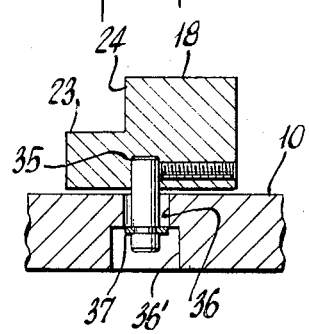
INVENTOR
EDWARD C. PALMENBERG
BY
Sandoe, Hopgood & Calimafde
ATTORNEYS

MEANS FOR MEASURING BOW IN A TURBINE BLADE

This invention relates to gaging and measuring devices for observing adherence to one of several dimensional factors critical to the performance of vanes in a turbine, such as the gas turbine of a jet aircraft.

Turbine-engine nozzle guide vanes or blades are subjected to rapid extremes of temperature and differential-pressure loading, and as a result the individual parts comprising a nozzle assembly become bent and otherwise distorted. Moreover, vanes which have seen service conditions, with accompanying deformation, are often repaired and reconfigurated by a hot-forming technique, and unless extreme care is exercised, this process can be another source of introducing deformation between the mounting surfaces of the outer and inner buttresses of the guide vane.

Such departures from "new" part dimensions prevent proper fitting of the vane into the support mechanism or shroud assembly; they also create a false angle of attack by the vane airfoil section or blade. Such conditions are unsuitable for proper engine performance.

The deformations and distortions which are deleterious to engine performance are various. But I have discovered that bow along the longitudinal span of the blade is a single factor of critical importance, and that bow may be reliably and simply measured and gaged along certain alignments, as a preliminary to vane-class gaging, in order to critically determine the acceptability or not of a particular vane. The present invention is concerned with the gaging and measurement of this bow factor.

It is accordingly an object of the invention to provide means for measuring or gaging bow, or departures from desired bow, in vane structures of the character indicated.

Another object is to achieve the above object with a device which, for a given vane configuration, is sensitive essentially only and critically to the bow factor.

It is a further object to provide means achieving the foregoing objects while at the same time establishing an accurate reference for subsequent class-gaging of a vane, thus materially reducing the chance of class-gage error, so as to maximize the assurance that, upon assembly of vanes in a given turbine stage, all nozzle-throat areas between adjacent vanes in said stage will be substantially the same, within closely set tolerance limits.

A specific object is to achieve the foregoing with basically simple structure which lends itself to reliable use by relatively unskilled personnel and which enables the checking of every vane element, before and after reconditioning.

Another specific object is to provide instrumentation to achieve the foregoing and having the inherent capability of assuring products which, insofar as the bow factor is concerned, equal or exceed the consistency and quality of newly manufactured vanes.

Other objects and various further features of novelty and invention will be pointed out or will occur to those skilled in the art from a reading of the following specification in conjunction with the accompanying drawings. In said drawings, which show, for illustrative purposes only, various forms of the invention:

FIGS. 2 and 3 are enlarged fragmentary views of a slightly modified instrument, being respectively plan and side-elevation views;

FIG. 3A is a sectional view at 3A—3A of FIG. 2, to illustrate the application of a vane to the instrument;

FIG. 4 is a fragmentary view in elevation, and partially in section, as viewed at 4—4 of FIG. 2;

FIG. 5 is a sectional view at 5—5 in FIG. 2; and

Briefly stated, the invention contemplates a bow-measuring instrument in which simultaneous evaluation of the bow in a turbine vane is made at offset alignments, on both the convex and the concave surfaces of the airfoil section of the vane. The offsets are selected, for each type vane, so as to critically observe the extent of bow at or near the local regions at which these surfaces cooperate to define a nozzle throat, when vanes are assembled in side-by-side circumferential adjacency in a given gas-turbine stage; specifically, the "high point" in the center of the airfoil is observed for bow, at the center and along the alignment of the die-loading, in the hot-forming correction of vane shape. In this manner, a simple gaging operation helps to achieve greatly enhanced control of the uniformity and correct sizing of all nozzle-throat areas in a given stage of the turbine; and much better referencing is obtained for further gaging techniques.

Figure 1:
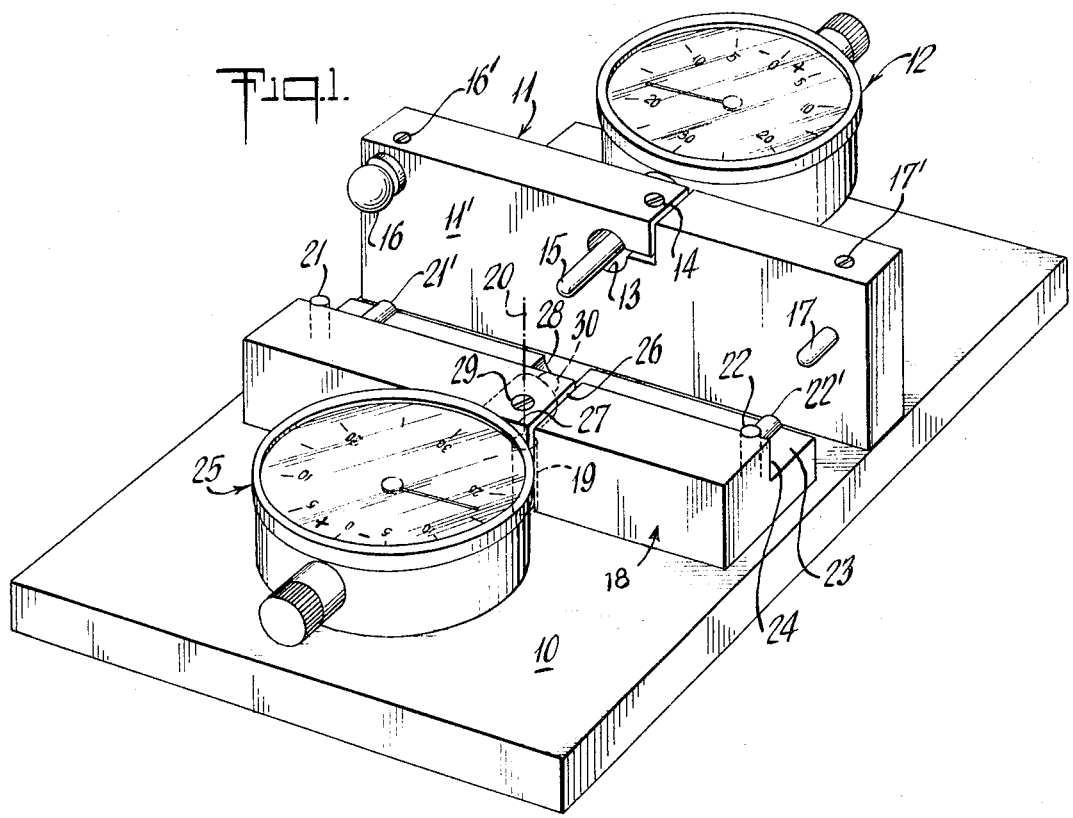
FIG. 1 is a view in perspective of a bow-measuring instrument of the invention.

Referring to FIG. 1, the invention is shown in application to a bow gage having a rigid frame comprising a flat base 10 which may be placed on or secured to a suitable work table. Formed with or secured to the base 10 is an upstanding bracket member 11, extending across the midsection of the base 10. The bracket member may be centrally slitted as shown to define a clamp to support and retain a first indicator gage 12 at a transverse bore 13, the clamp being set up by a countersunk bolt 14. A probe 15 forms part of the gage 12 and projects transversely beyond the bore 13, bore for contact with a local region of the convex surface of an inserted vane, as will later be more fully explained in connection with FIG. 3A. It suffices at this juncture to say that the span axis or longitudinal direction of the inserted vane extend across the base 10 and that the convex surface is generally erect and directly facing the probe 15 and the front face 11' of the bracket member 11. Longitudinally spaced fixed abutments 16–17 project transversely for point contact with the convex vane surface. Abutment 16 is shown as a hard sphere or ball at the end of a mounting shank held by screw 16' in fixed projecting relation to member 11; abutment 17 is shown as a spherically tipped hard pin, similarly secured by setscrew 17' in fixed projecting relation to member 11.

Remaining support for the inserted vane is provided by spaced abutments that may have longitudinal locations corresponding to those of the abutments 16–17. These remaining spaced abutments provide frame-based corner support for the trailing edge of the vane and are of such nature as to define an axis about which the applied vane may have a limited range of angular pivoting freedom, until the convex vane surface becomes located by abutment means 16–17. To assure that all four abutments may be realized, even in the presence of a warped or twisted vane, the abutments 16–17 and the trailing edge supporting abutments are on different mounts, with freedom to swivel with respect to each other, about a vertical pivot axis; in the form shown, this swivel is provided for the mount or auxiliary base member 18 which carries the speed abutments to support the trailing edge of the vane. An upstanding pin 19, set in the base 10 fits a suitable bore of the bottom of member 18 to establish a central upstanding swivel or pivot axis 20.

Various means may be provided for the described pivotal support of the trailing edge of the vane, but I have obtained most reliable results using a pair of hardened inserts insets at each of the vane-edge support locations, and effectively forming an inside-locating corner support. At a first such abutment location, the pair of inserts is identified 21–21'; at the second abutment location, the pair of inserts is identified 22–22'. The axes of the elements 21–21' and 22–22' are preferably orthogonally related in spaced regions or planes that are substantially transverse to the span of the vane, thus establishing a "corner" within which the vane may be rocked or pivoted to a limited degree between the 90° spaced axes of the rods of each pair. Conveniently, each of the rods is supported by pressfit to a bore in member 18, the bores being extended as grooves in horizontal and vertical corner surfaces 23–24 in member 18. Thus, the parts of rods 21–21' and 22–22' relied upon for trailing-edge support project slightly as ridges, beyond surfaces 23–24.

In a manner similar to that described for gage 12, a second gage 25 is carried centrally of the member 18. Thus, a slitted region 26 defines a clamp jaw 27 by which the gage 25 is held fast to a transverse mounting bore 28, when clamp bolt 29 is set. In the clamped position, the probe tip 30 of gage 25 projects beyond bore 28 and beyond the reference alignment established by the vertical abutment rods 21-22. Probe 30 is contacted and yieldably depressed upon placement of the trailing edge of the vane into supported contact with rods 21-21' and 22-22'. The axis of probe displacement preferably intersects or comes close to intersecting the axis 20 on which member 18 is pivotable.

Most of the showing of FIGS. 2, 3 and 5 provides more specific detail for the instrument thus far described, and so the same reference numerals are used, where applicable. FIGS. 2, 3 and 5 are useful to illustrate preferred relationships as to the pivoted support of member 18 on base 10. This comprises four balls 31-32-33-34, set in shallow bores in the top of base 10, so as to project enough to position member 18 in slight clearance or spaced relation, above base 10. The point contacts of ball supports 31-32 stabilize the corners of member 18 at one end, and ball contacts at 33-34 similarly stabilize the other end. And a retaining pin 35 carried by member 18 projects through and substantially clears a limited bore 36 in base 10, to determine limits of angular freedom for member 18 to pivot about the pin 19 and its axis 20; in FIG. 2, the bore 36 is seen to be a short slot, which may be arcuate about axis 20. A snap ring 37 is carried by a groove in pin 35, at the bottom of an enlarged counter bore 36', to retain the assembled relationship of member 18 to the base 10.

Figure 7:
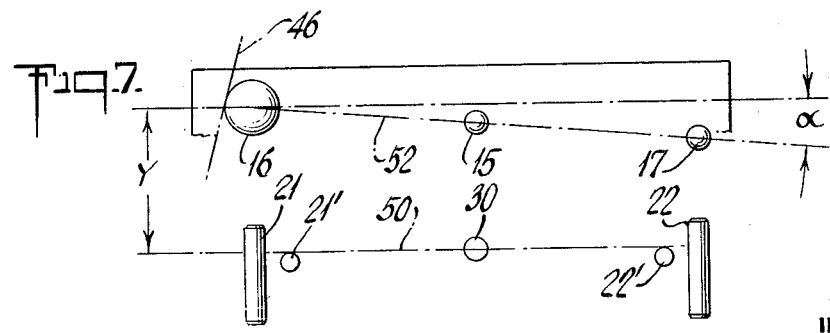

In use, a vane 40 (see FIG. 3A) comprising a blade 41 spanning the distance between two spaced buttresses, such as the buttress 42, is placed on the instrument by laying the trailing edge 43 into the crotch of abutments 21-21' and 22-22' and with the convex surface 44 oriented upwardly and facing the bracket member 11. Light manual pressure into this corner or crotch supported relation is sufficient to cause the concave surface 45 at the trailing edge to depress probe tip 30 and thus actuate the gage 25. The vane is rocked or pivoted about the trailing edge until limited by simultaneous contact with the vertically offset abutments 16-17, and in the course of achieving this relation the pivot 19 adapts member 18 to the twist taper or other character of the vane configuration. In the process of abutting the convex surface at 16-17, the probe 15 is intercepted and depressed, to actuate gage 12. While thus held, as by the left hand, the vane is urged to the right until limited by a buttress-reference surface, as against the sphere 16; FIG. 7 schematically illustrates such contact for the buttress-reference surface 46. Readings are then noted for the indicators of the two gages, and if their dials have been set for zero indications of the design bow conditions, then departures are quantitatively displayed as plus or minus deviations from the design condition.

FIGS. 2, 3 and 4 also serve to illustrate a slight modification in which an outboard abutment 47 is used to transversely locate the vane 40, rather than the previously described contact of reference surface 46 with sphere 16. In FIGS. 2, 3 and 4, the abutment reference surface will be understood to be on the outer transverse surface or end of buttress 42, for limiting contact at 47. The abutment 47 is shown as a crowned or rounded pin, fixed to an upstanding bracket 48 which in turn, is secured to the base 10 by way of an offset or spacer 49.

In constructing the described instruments, the baseplates, plates, brackets and other elements which serve only for mounting, such as brackets 11-48 are conveniently made of flat ground low-carbon steel. On the other hand, the abutment elements, such as insert rods, positioning studs, balls and pairs, and abutment brackets such as member 18 (which constantly rides the balls 31-32-33-34) are made of tool steel, hardened for example to Rockwell "C" 58-60.

Figure 6:
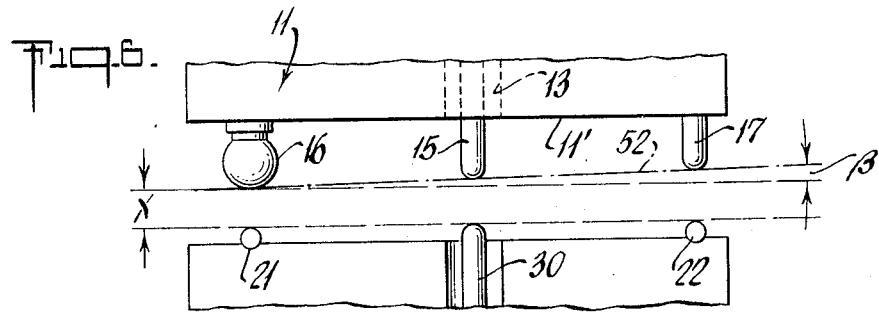
FIGS. 6 and 7 are simplified schematic views, respectively taken in plan and front elevation aspects, to illustrate relationships of important cooperative elements in my instrument, whether of the form of FIG. 1 or the form of FIGS. 2 to 4.

FIGS. 6 and 7 illustrate in greater detail the specific alignment of abutments which straddle each of the probe contacts 15-30 for a particular turbine blade. The axis of alignment 50 of trailing-edge support is preferably parallel to the base 10 so as to simplify the standardized master gage-block setup and checking of the instrument. The axis of probe 30 intersects the alignment 50 and is preferably midway between the trailing-edge support abutments 21-21' and 22-22'. The point contacts 16-17 for the convex surface 44 align with the contact of probe 15 in accordance with the orientation of the span axis 51, (see FIG. 3A), when the airfoil section is trailing-edge referenced to the alignment 50 and when it is also buttress-referenced (e.g., at 46), as already described: thus, for the form shown in FIG. 7, wherein the outer buttress locates at the left end, the alignment axis 52 of contacts 16-15-17 slopes downwardly at the angle $\alpha$, to accord with the slope of the span axis 51 with respect to the trailing edge 43. The alignment 52 is preferably on the "throat line" (i.e., substantially aligned with the "shadow" of a trailing edge 43 of one vane on the adjacent surface of the next vane) and is thus offset from the alignment 50 to an extent which enables abutment contact (16-17) and probe contact (15) at that particular local region of the airfoil surface (44) which serves the nozzle throat when in shrouded assembly with other vanes; contact 15 thus probes for the bow condition of the convex surface 44 at or near the region most determinative of gas flow in the completed engine. Specifically, the alignment 52 is selected at the "high point" alignment of contact by the hot-forming die used in the vane "straightening" operation, the probe 15 being preferably substantially aligned with the center or force vector of such die. Similarly, contact 30 probes for the bow condition of the concave surface 45 at or near the same airfoil section as sensed by probe 15, thus also probing the nozzle-throat region most determinative of gas flow in the completed engine. For the particular vane for which the instrument of FIGS. 6 and 7 is set up, the normal twist in the airfoil adds to further component $\beta$ to the orientation of alignment 52 with respect to the reference alignment 50, and this means that to gage this particular vane, the member 18 will pivot freely (about axis 20) to adapt to the component $\beta$. Lastly, FIGS. 6 and 7 identify at $x$ and $y$ the respective horizontal and vertical components of the offset of the alignment 52, at the leftmost contact location 16.

The described constructions have been found to reliably measure bow on individual vanes that are reconditioned, straightened or rebuilt. These constructions meet the stated objects and have reliably served in hundreds of thousands of gaging operations, without noticeable wear. Each blade is measured once, at the two local regions which critically reflect hot-forming die action and are basic to determination of correct ultimate gas-flow capability. The vanes which pass my bow-measuring instrument, and which also pass the twist-measuring instrument of my copending application Ser. No. 25,506, have enabled subsequent simple class-gaging operations which are so accurate that resulting vane performance is equal to or better than that of newly manufactured, unused, original products. All testing and gaging may be performed by relatively unskilled personnel, on a "go:no-go" basis for each observed vane.

While the invention has been described in detail for the forms shown, it will be understood that modifications and adaptations may be made without departure from the scope of the invention.

I claim:

1. Gage means for observing bow in a turbine vane having opposed convex and concave surfaces over an elongated span extending between integral outer and inner buttresses, said vane surfaces defining an airfoil section extending transversely of the span axis between leading and trailing edges, there being a reference surface on one of said buttresses extending generally transversely of the span axis, said gage means comprising a rigid frame with a base and upstanding bracket means that is sufficiently elongated along said base as to embrace a substantial length of said span, a first pair of vane-positioning abutments fixedly positioned with respect to each other and carried on said base with each defining an inside-locating corner for supporting engagement with the trailing edge of the vane at longitudinally spaced locations when the vane airfoil is substantially upstanding with one of its said surfaces extending alongside and facing said bracket means, a second pair of abutments fixed to said bracket means and projecting in offset and generally opposed relation to said first abutments for locating contact with correspondingly spaced points on said one vane surface, thereby establishing a reference alignment between said points, means pivotally associating the pair of abutments on said base with the pair of abutments on said bracket means and about an axis that is generally perpendicular to said base, and a gage carried by said frame and including a probe spaced from said abutments and extending in the general direction of said first abutments for contact with said one vane surface at a location between said second abutments, said probe being responsive to location of a part of said one vane surface when the latter is referenced to all abutments; whereby for vanes successively applied to said gage means, said gage is sensitive to variations in bow of said one vane surface.

2. Gage means according to claim 1, in which the elevation of alignment of said second abutments is offset from the elevation of trailing-edge support alignment provided by said first abutments.

3. Gage means according to claim 2, in which said offset corresponds substantially to the design offset of the span axis with respect to the trailing edge of the vane.

4. Gage means according to claim 2, in which said probe location is at an elevation that is substantially the mean of the elevations of the respective second abutments.

5. Gage means according to claim 1, in which the longitudinal location of said probe is substantially midway between said second abutments.

6. Gage means according to claim 1, in which said first pair of abutments and said second pair of abutments are spaced substantially the same and between substantially the same longitudinal regions of said vane span.

7. Gage means according to claim 1, in which said first two vane-positioning abutments are hardened rods with their axes substantially transverse to the alignment or trailing-edge support.

8. Gage means according to claim 1, in which said first two vane-positioning abutments include adjacent horizontal and upstanding abutment elements to establish spaced corner supports for the trailing edge.

9. Gage means according to claim 8, in which each of said first vane-positioning abutments comprises a pair of hardened rods on substantially orthogonally related axes that are substantially transverse to the alignment of trailing-edge support.

10. Gage means according to claim 9, in which the orientation of said rods is such as to embrace the trailing edge at only two angularly related contact points for each of the spaced locations of said first vane-positioning abutments.

11. Gage means according to claim 1, and including a second gage carried on said base and having a probe extending in the general direction of said second abutments for contact with the other vane surface at a location between said first abutments.

12. Gage means according to claim 11, in which the location of the second-gage probe is substantially midway between said first abutments.

13. Gage means according to claim 11, in which the elevation of the second-gage probe is substantially that of the alignment of trailing-edge support.

14. Gage means according to claim 2, in which said frame includes separate mounts for said first abutments and for said second abutments, said pivotal means pivotally relating one of said mounts with respect to the other and about an upstanding pivot axis.

15. Gage means according to claim 14, in which the pivoted mount carries said first abutments.

16. Gage means according to claim 14, in which a gage carried by the pivoted mount includes a probe extending in the general direction of said second abutments for contact with the other vane surface between said first abutments.

17. Gage means according to claim 14, in which the pivot axis is longitudinally intermediate the vane-support locations established by said abutments.

18. Gage means according to claim 17, in which the pivoted mount carries said first abutments, and in which the gage carried by the pivoted mount includes a probe extending in the general direction of said second abutments for yielding contact with the other vane surface between said first abutments, the axis of yielding contact substantially intersecting the pivot axis.

19. Gage means according to claim 1, and including a frame-referenced buttress-locating abutment poised to engage said buttress-reference surface when the vane is otherwise supported by said first and second abutments.

20. Gage means according to claim 19, in which said buttress-locating abutment is one of the elements of one of said second two abutments.

21. Gage means according to claim 20, in which said one element is spherical, for concurrent contact with a point on said one surface and with a point on said buttress-reference surface.

22. Gage means according to claim 19, in which said frame-referenced buttress-locating abutment is carried by an upstanding end bracket and is positioned for point contact with the adjacent buttress-reference surface substantially on the alignment of the span axis.

23. Gage means for observing bow in a turbine vane having opposed convex and concave surfaces over an elongated span extending between integral outer and inner buttresses, said vane surfaces defining an airfoil section extending transversely of the span axis between leading and trailing edges, said gage means comprising a base, a first pair of spaced supporting abutments carried by said base and adapted to engage spaced locations along the trailing edge of the vane, each of said abutments defining an inside-location cover for a part of an inserted trailing edge, the nature of such engagement being such as to enable a limited degree of angular rocking of the vane about its trailing edge while located by said abutments, further abutment means comprising a second pair of longitudinally spaced abutments carried by said frame in offset and generally opposed relation to said first abutments and adapted to engage the convex surface of the vane at an offset location substantially corresponding to the offset of the span axis from the trailing edge, whereby the vane is angularly located to define one limit of said limited degree, means pivotally associating the first pair of abutments with respect to the second pair of abutments and about a generally upstanding axis, for relative to and fro movement of said pairs with respect to each other, and a gage carried by said frame and including a probe spaced from and between said first abutments and extending in the general direction of said second abutments for contact with the concave surface of the vane at substantially the trailing-edge portion thereof.

24. Gage means according to claim 23, in which said probe contacts said concave surface substantially midway between said two supporting abutments.

25. Gage means according to claim 23, in which said further abutment means is longitudinally offset from the longitudinal location of probe contact with the vane, and a second gage having a probe positioned to contact the convex surface of the vane at a location longitudinally offset from said further abutment means and radially offset from the alignment axis of trailing-edge support.

26. Gage means for observing bow in a turbine vane having opposed convex and concave surfaces over an elongated span extending between integral outer and inner buttresses, said vane surfaces defining an airfoil section extending traversely of the span axis between leading and trailing edges, said buttresses having opposed elongated abutment surfaces for nested abutment with corresponding adjacent surfaces of the next adjacent vane when in shrouded assembly about a turbine axis, thereby defining a nozzle-throat relation between a throat line region of the convex surface of one vane and the adjacent trailing-edge region of the concave surface of the next-adjacent vane in such assembly, said gage means comprising a base, a first pair of abutment means fixedly positioned with respect to each other and carried on said base with each defining an inside locating corner for part of an inserted trailing edge, thereby establishing an alignment of trailing-edge pivotal support about an axis between spaced trailing-edge support references, second abutment means comprising a second pair of longitudinally spaced abutments carried by said base in offset and generally opposed relation to said first abutments and posed to engage the convex vane surface at a region offset from said axis and substantially in said throat line region, thereby establishing a limit of angular pivot action, means pivotally associative the first pair of abutment means with respect to the second pair of abutment means and about a generally upstanding axis, for relative to and fro movement of said pairs with respect to each other, and gage-probe means including a first element extending in the general direction of said second abutment means and positioned to contact the trailing-edge region at a location between said support references and a second element extending in the opposite general direction of said first element and poised to contact substantially said throat line region of the convex surface at a location longitudinally offset from said second abutment means.

27. Gage means according to claim 26, in which said first element of said gage-probe means is positioned to contact the trailing-edge portion of the concave surface of the vane.

* * * * *